United States Patent [19]

Stephenson III et al.

[11] Patent Number: 5,864,718
[45] Date of Patent: Jan. 26, 1999

[54] ONE-TIME USE CAMERA WITH MULTI-LAMP FLASH

[75] Inventors: Stanley W. Stephenson III, Spencerport; Alan G. Codd, Jr., Rochester, both of N.Y.

[73] Assignee: Eastman Kodak Company, Rochester, N.Y.

[21] Appl. No.: 976,853

[22] Filed: Nov. 24, 1997

Related U.S. Application Data

[63] Continuation-in-part of Ser. No. 779,553, Jan. 8, 1997, abandoned.

[51] Int. Cl.⁶ .................................................. G03B 15/03
[52] U.S. Cl. .............................. 396/6; 396/176; 396/178; 396/192
[58] Field of Search ................................. 396/61, 62, 155, 396/174, 175, 176, 177, 178, 182, 192, 197, 6; 362/11, 12, 13, 14, 15

[56] References Cited

U.S. PATENT DOCUMENTS

| | | |
|---|---|---|
| 3,223,010 | 12/1965 | Rentscheler et al. . |
| 3,608,451 | 9/1971 | Kelem . |
| 4,311,374 | 1/1982 | Johnson et al. . |
| 4,866,285 | 9/1989 | Simms . |
| 4,893,139 | 1/1990 | Alligood et al. . |
| 4,897,680 | 1/1990 | Lo . |
| 5,255,032 | 10/1993 | Michaud . |
| 5,266,990 | 11/1993 | Sakamato et al. . |
| 5,276,474 | 1/1994 | Dassero . |
| 5,406,343 | 4/1995 | Stephenson . |

*Primary Examiner*—Howard B. Blankenship
*Attorney, Agent, or Firm*—Roger A. Fields

[57] ABSTRACT

A one-time-use flash camera comprising a camera housing that contains a cartridge chamber holding a film cartridge and a film roll chamber holding an unexposed film roll on which a predetermined maximum number of exposures can be made, and a flash device, is characterized in that the flash device has a total number of flash lamps that is equal to the predetermined maximum number of exposures that can be made on the unexposed film roll, and is connected non-removably to the camera housing in order that the flash device must be broken off the camera housing to separate the flash device from the camera housing, whereby once each one of the flash lamps is used there will not be any exposures that can be made and the one-time-use flash camera must be discarded.

3 Claims, 2 Drawing Sheets

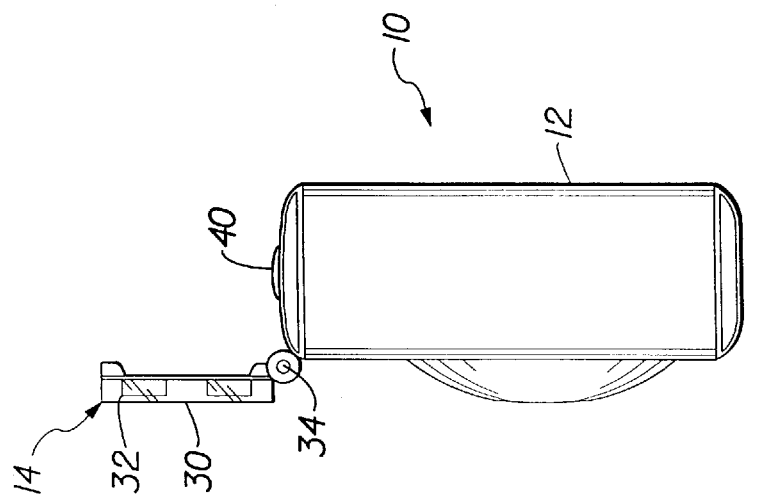
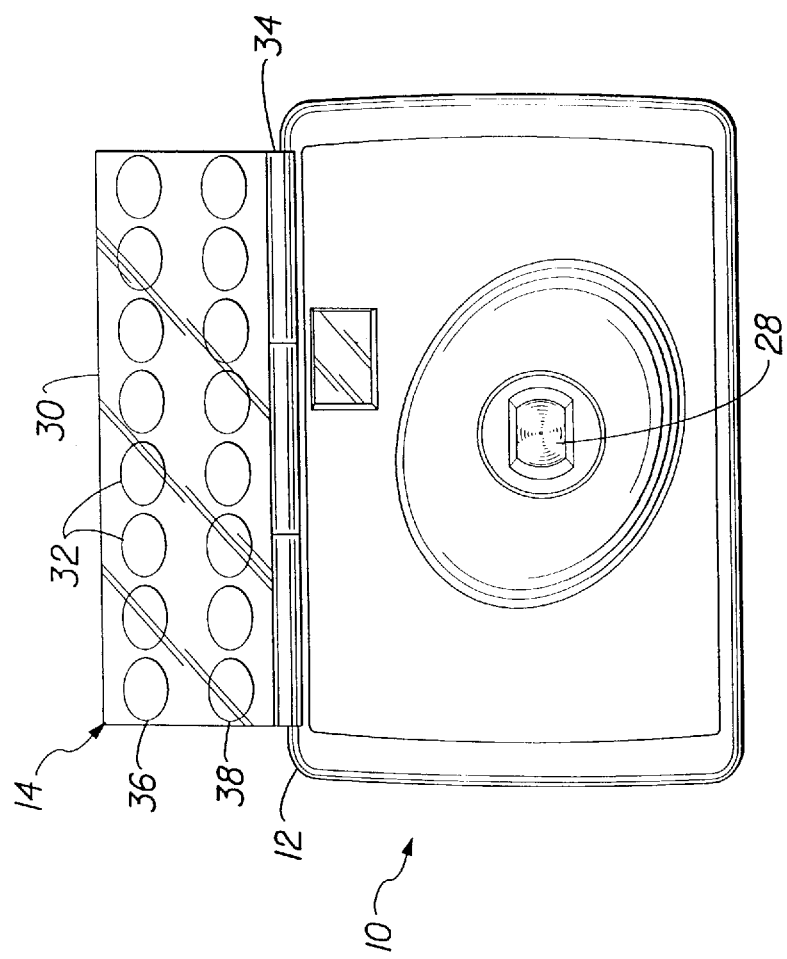

ONE-TIME USE CAMERA WITH MULTI-LAMP FLASH

CROSS-REFERENCE TO RELATED APPLICATION

This application is a continuation-in-part of commonly assigned application Ser. No. 08/779,553 entitled ONE-TIME-USE CAMERA WITH MULTI-LAMP FLIP-FLASH and filed Jan. 8, 1997 in the names of Stanley W. Stephenson III and Alan G. Codd Jr., now abandoned.

FIELD OF THE INVENTION

The invention relates generally to the field of photography, and in particular to one-time-use cameras. More specifically, the invention relates to a one-time-use camera with a multi-lamp flash.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, an unexposed film roll on a film spool in a film supply or film roll chamber, a fixed-focus taking lens, a film metering mechanism with a rotatably supported metering sprocket, a manually rotatable film advance thumbwheel rotatably engaged with a film spool inside the film cartridge, a single-blade shutter, a manually depressible shutter release button, a frame counter for indicating the number of available exposures remaining on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the film spool in the film supply chamber and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

SUMMARY OF THE INVENTION

A one-time-use flash camera comprising a camera housing that contains a cartridge chamber holding a film cartridge and a film roll chamber holding an unexposed film roll on which a predetermined maximum number of exposures can be made, and a flash device, is characterized in that:

the flash device has a total number of flash lamps that is equal to the predetermined maximum number of exposures that can be made on the unexposed film roll, and is connected non-removably to the camera housing in order that the flash device must be broken off the camera housing to separate the flash device from the camera housing, whereby once each one of the flash lamps is used there will not be any exposures that can be made and the one-time-use flash camera must be discarded.

BRIEF DESCRIPTION OF THE DRAWINGS

FIG. 3 is a front elevation view of the one-time-use camera, showing the flip-flash flipped up for use; and FIG. 4 is an end elevation of the one-time-use camera as shown in FIG. 3.

DETAILED DESCRIPTION OF THE INVENTION

Figure 2:
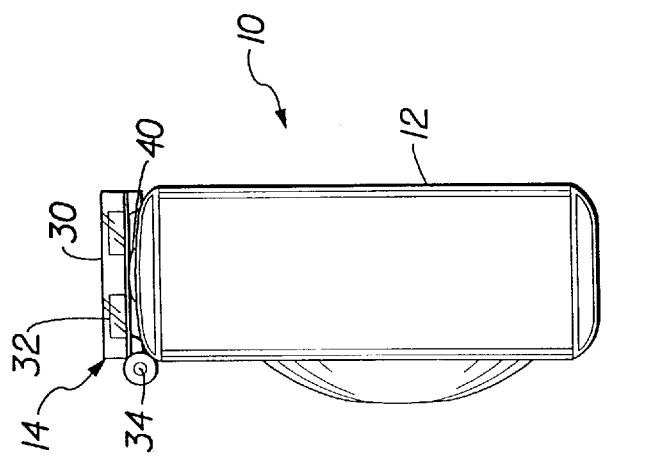
FIG. 2 is an end elevation of the one-time-use camera as shown in FIG. 1.

The invention is disclosed as being embodied preferably in a one-time-use flash camera. Because the features of a one-time-use flash camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a one-time-use flash camera 10 comprising a known camera housing 12 and a novel multi-lamp flip-flash 14.

Figure 1:
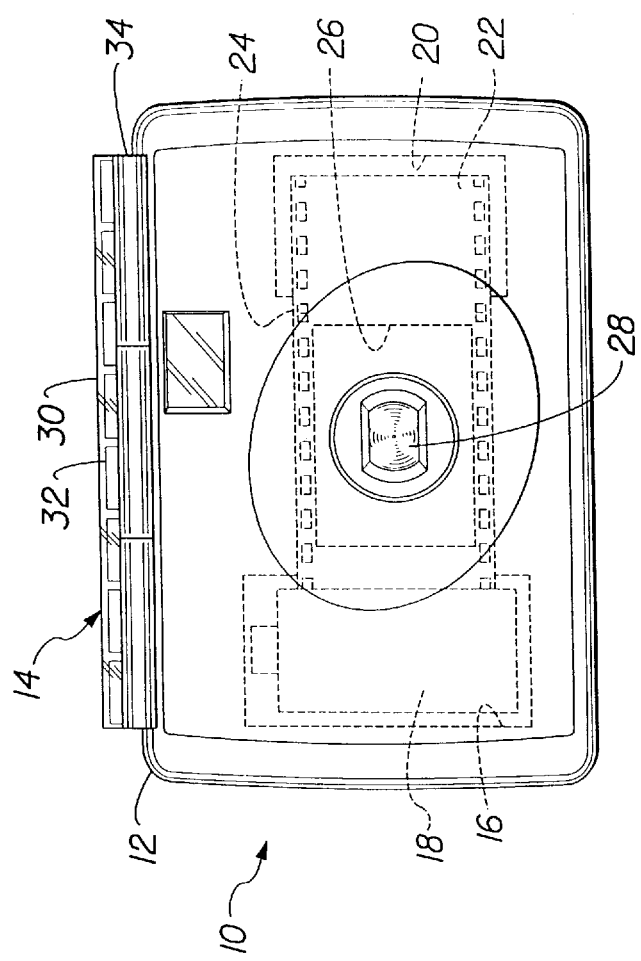
FIG. 1 is a front elevation view of a one-time-use camera with a multi-lamp flip-flash according to a preferred embodiment of the invention, showing the flip-flash flipped down for storage.

The camera housing 12, as shown in FIG. 1, contains a cartridge chamber 16 holding a conventional 35 mm film cartridge 18 and a film roll chamber 20 holding an unexposed film roll 22 on which a predetermined maximum number of exposures can be made. For example, sixteen exposures. An intermediate film section 24 extends across a backframe opening 26, behind a fixed focus taking lens 28, from the unexposed film roll 20 to inside the film cartridge 18.

The multi-lamp flip-flash 14 is a rectangular flash bar 30 with a total number of flash lamps 32, that is equal to the predetermined maximum number (i.e. sixteen) of exposures that can be made on the unexposed film roll 22, and is supported at a known pivot connection 34 to the camera housing 12 to rest entirely on top of the camera housing when not used and to be flipped up from the camera body to be used. As can be seen from FIGS. 1 and 3, the flash lamps 32 are arranged in two parallel equal-number rows 36 and 38 that longitudinally extend at least over the cartridge chamber 16 and the film roll chamber 20. This results in a relatively compact, inexpensive, design. Of course, any number of rows is possible.

The known pivot connection 34 can be a pin-in-hole connection, a rotatable rivit connection, or other suitable pivot connection. However, it must be one that connects the flash bar 30 non-removably (i.e. permanently) to the camera housing in order that the flash bar must be broken off the camera housing, possibly in the area of the pivot connection, to separate the flash bar from the camera housing. Consequently, once each one of the flash lamps 32 is used there will not be any exposures left that can be made, and the one-time-use flash camera 10 must be discarded.

As shown in FIGS. 2 and 4, the flash bar 30 covers a shutter release button 40 when the flash bar is flipped down for storage and uncovers the shutter release button when the flash bar is flipped up for use. This, alternatively, prevents and permits picture-taking.

The invention has been described with reference to a preferred embodiment. However, it will be appreciated that variations and modifications can be effected by a person of ordinary skill in the art without departing from the scope of the invention.

PARTS LIST 10. one-time-use camera
12. camera housing
14. multi-lamp flip-flash
16. cartridge chamber
18. film cartridge
20. film roll chamber
22. unexposed film roll
24. intermediate film section
26. backframe opening
28. taking lens
30. flash bar
32. flash lamps
34. pivot connection
36. row of flash lamps
38. row of flash lamps
40. shutter release button

What is claimed is:

1. A one-time-use flash camera comprising a camera housing that contains a cartridge chamber holding a film cartridge and a film roll chamber holding an unexposed film roll on which a predetermined maximum number of exposures can be made, and a flash device, is characterized in that:

said flash device has a total number of flash lamps that is equal to the predetermined maximum number of exposures that can be made on said unexposed film roll, and is connected non-removably to said camera housing in order that the flash device must be broken off the camera housing to separate the flash device from the camera housing, whereby once all of said flash lamps are used there will not be any exposures to be made and said one-time-use flash camera should be discarded.

2. A one-time-use flash camera as recited in claim 1, wherein said flash device is supported on top of said camera housing with said flash lamps extending at least over said cartridge chamber and said film roll chamber.

3. A one-time-use flash camera as recited in claim 1 or 2, wherein said flash device is supported to rest on top of said camera housing when not used and to be flipped up from the camera housing to be used.

* * * * *